United States Patent
Morris

(10) Patent No.: US 7,107,232 B2
(45) Date of Patent: Sep. 12, 2006

(54) METHOD AND SYSTEM FOR FACILITATING A SALE

(76) Inventor: Robert A. Morris, 4206 Heatherstone Dr., Sarasota, FL (US) 34238

( * ) Notice: Subject to any disclaimer, the term of this patent is extended or adjusted under 35 U.S.C. 154(b) by 935 days.

(21) Appl. No.: 09/784,936

(22) Filed: Feb. 16, 2001

(65) Prior Publication Data

US 2001/0034662 A1 Oct. 25, 2001

(51) Int. Cl.
*G06Q 30/00* (2006.01)
(52) U.S. Cl. .............................. 705/26; 705/35; 705/37
(58) Field of Classification Search ................. 705/26, 705/35, 37
See application file for complete search history.

(56) References Cited

U.S. PATENT DOCUMENTS

| | | | | |
|---|---|---|---|---|
| 5,787,402 | A * | 7/1998 | Potter et al. ................... | 705/37 |
| 6,598,026 | B1 * | 7/2003 | Ojha et al. ..................... | 705/26 |
| 2002/0055901 | A1 * | 5/2002 | Gianakouros et al. ......... | 705/37 |
| 2004/0059668 | A1 * | 3/2004 | Togher et al. ................. | 705/37 |

FOREIGN PATENT DOCUMENTS

WO    WO 00/48113 A1 * 8/2000

OTHER PUBLICATIONS

Deltas, George M., Ph.D., "Essays in auctions and procurement: Ana analysis of bidding rings, left bids, stochastic properties of winning bids, and two step structural estimators of bidding for contracts"; Yale University, 1996 extracted from Internet on May 5, 2006 from Proquest database.*

* cited by examiner

Primary Examiner—Yogesh C. Garg
(74) Attorney, Agent, or Firm—Charles J. Prescott

(57) ABSTRACT

The present invention provides a method and system for facilitating a sale of debt accounts between a seller and one or more potential buyers. The method of the present invention preferably comprises the principal steps of (a) creating a computer readable database comprising data pertaining to a plurality of debt accounts, each account comprising a plurality of data fields; (b) grouping the accounts into at least one lot based upon at least one correlation among the data in the data fields; (c) searching the computer readable database for information corresponding to information designated by the potential buyers; (d) receiving one or more purchase offers for one or more lots from the potential buyers; and (e) communicating the purchase offers to the seller. The present invention further facilitates a sale of an item between a seller and a buyer which comprises the following principal steps: (a) receiving from at least one seller information pertaining to a plurality of items to be offered for sale; (b) establishing a spending limit for the buyer, the spending limit including a balance which designates an amount of funds available to the buyer; (c) communicating to the buyer at least a portion of the information pertaining to the items to be offered for sale; (d) receiving a plurality of purchase offers from the buyer, each purchase offer having an item and purchase price associated therewith, wherein each purchase price may be for an amount less than or equal to the balance of the spending limit; (e) communicating the pending purchase offers to each seller; (f) receiving an acceptance of a purchase offer from a seller; (g) calculating a new balance for the buyer's spending limit by deducting from the spending limit the purchase price associated with the offer; and (h) withdrawing any of the buyer's pending purchase offers for which the associated purchase price exceeds the amount of the new balance.

3 Claims, 11 Drawing Sheets

MARKET OVERVIEW

Seller's Control Computer

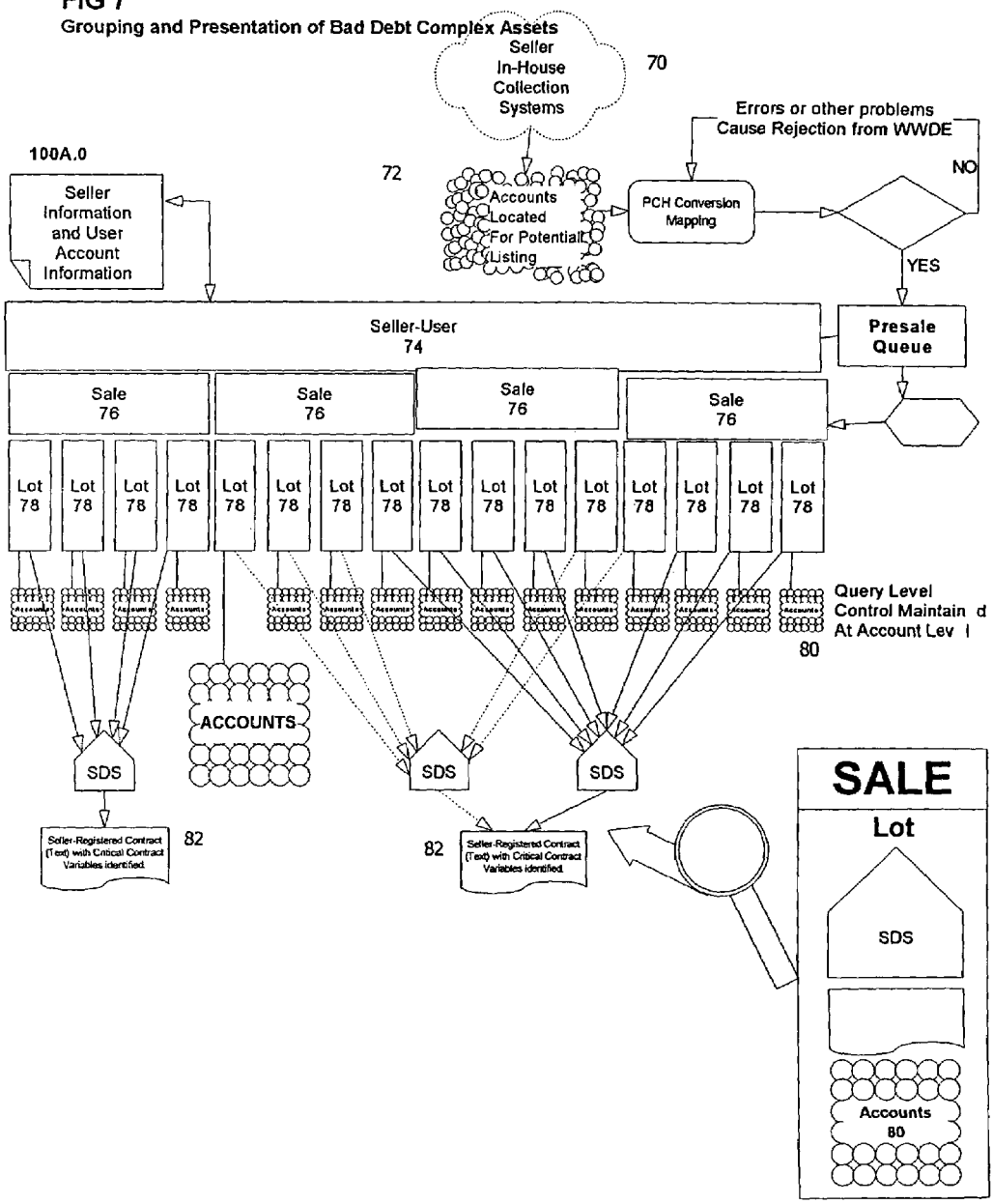

FIG. 8

Registry, UPSS and Proprietary Storage Technique

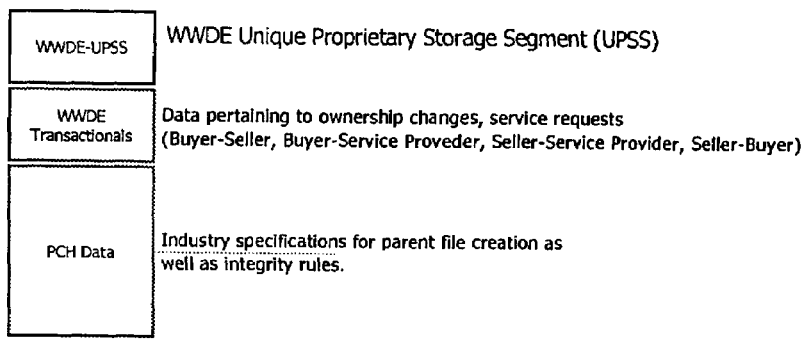

WWDE-UPSS

WorldWide Debt Exchange's UPSS will be at the heart of our design as we expand from domestic to international markets. Within the UPSS will be the following information in this order:

1. Three-letter code (ISO 3166) designating the originating country of the debt that was charged off
   (country of residence will be stored as well but outside UPSS).
2. Two-letter code designating the currency of the debt owed.
3. Five-Character Creditor Code representing the selling creditor.
4. The full account number by the creditor. If account number is alpha, then Alpha-Correlate (A=1, B=2, etc.).
5. The amount originally charged-off (no decimal) in the respective currency.
6. Chargeoff date in YYYYMMDD format.
7. CHECK DIGITS (2) = RIGHT(sum(value(co_bal*100), value(left(acctnum,2)),value(right(co_year,2)), value(co_month), value(co_day)),2)

EXAMPLE:

Debt originated in USA.
Currency is $US Dollars
Chargeoff Balance is $4,144.11
Five-character code representing the selling creidtor is ABCDE
Full account number is 4111 222 333 444
Chargeoff Date 2000-01-01

UPSS = USA US ABCDE 4111222333444 414411 20000101 54

In addition to the inventors of PCH having created this standard,
WWDE has other useful fields relating to the current national domicile
of debtor to accomodate debts that originated in one country but now
reside in another - this will ultimately provide the international market access
to non-domestic debts where the debtors have moved to another country.

| | |
|---|---|
| SY | Date-Time field and record provider |
| AC | Information about the account holder(s) |
| BK | Information surrounding the debt |
| OW | Current information as per the current owner of the account, which could also be the selling bank |
| JD | Information surrounding a judgement |
| PM | Specific Payment Information |
| CM | Freeform or comments area |
| FT | Unused/Reserved |

FIG 8

ASSISTING A BUYER IN UNDERSTANDING THE COMPLEX ASSET

Buyer-Seller Compatability Matching and Optimal Sub-Lot Packaging Based on WWDE MARKET SENSE FIG. 12A
Phantom Bidding Extending Offers to Buy
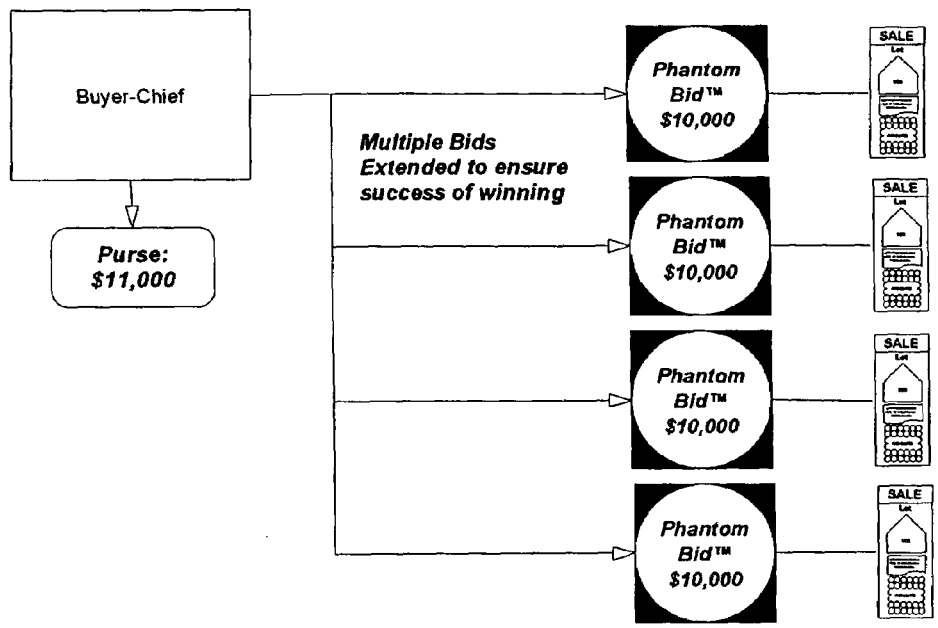
FIG. 12B    Accepted/Withdrawn Offers
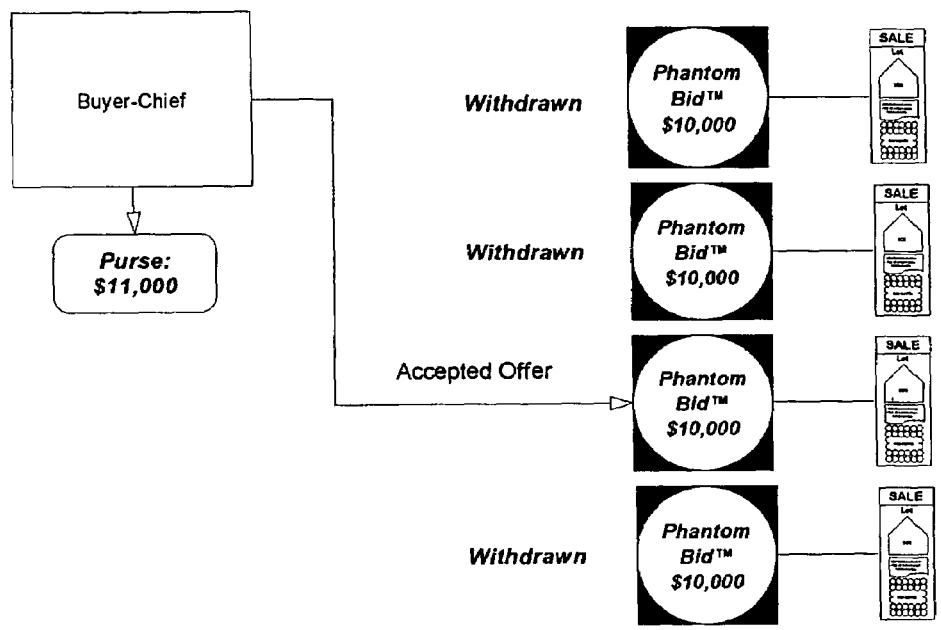

METHOD AND SYSTEM FOR FACILITATING A SALE

BACKGROUND OF THE INVENTION

The present invention relates to a method and system for facilitating a sale of debt using a computer network.

The market that processes bad or charged-off debt receivables has grown substantially in recent years. Representing a shift in the paradigm of the creditor processing methods of charge-offs, bad debt sales have become typical in the world of credit collection as an alternative and competing process to traditional agency placements. However, the lack of an organized market for the sale of debt accounts, combined with the complexity of the asset, has heretofore hindered debt sales.

Debt accounts are complex asset and many factors affect the value of a portfolio of debt accounts. For example, each of the following criteria must be considered to accurately access a portfolio's value: i) the type of accounts (e.g., credit card accounts, consumer loans, auto loans, commercial loans, mortgages, student loans, retail accounts, telecommunication accounts, utility accounts, bad checks, bankruptcy judgments, etc.); ii) identity of the lending institution or original account holder; iii) the placement level, or the number of agencies that have attempted to collect on the accounts (e.g., at charge-off, after firsts, after seconds, after thirds, etc.); iv) the geographic origin of the accounts (e.g., country, region, state, city, zip code, etc.); v) the principal value of the portfolio; vi) account balances; vii) age of the accounts; viii) selling institution; ix) purchase contract terms (e.g., representations and warranties).

Given the many factors that affect the value of a portfolio of debt accounts, the ability to communicate and receive accurate information relating to the debt accounts is critical to the buying and selling process. However, there has been no effective standardization in the language used to communicate information relating to debt accounts being offered for sale. Heretofore, sellers of debt accounts have generally organized the accounts into a portfolio and then created non-standardized description for the portfolio.

The lack of a standardized system has a number of drawbacks. For example, when advertising a portfolio for sale the seller may not provide all of the critical information that the buyer needs to properly access the value of the accounts. In addition, because of the lack of standardization, information provided by the seller may be misinterpreted by the buyer. For example, the buyer's definition of terms such as "consumer loans" or "after firsts" may differ significantly from the seller's definition. The lack of standardization under the present system has generally made the selling of debt accounts a difficult and time-consuming process in which the potential buyer must conduct a significant amount of due diligence before an assessment of the value of a debt portfolio can be made. As a practical matter, the time and expense of assessing the value of a debt account under known systems has prevented many potential smaller buyers from entering the debt market. Thus, there is a strong need for a standardized system of communicating information relating to debt accounts being offered for sale.

Another disadvantage of presently used methods for selling debt accounts is the manner in which accounts are grouped into portfolios. For example, prior to the present invention, there has been no effective methodology for considering sales demand when grouping accounts into portfolios. Sellers have generally selected arbitrary factors to group accounts or have grouped them randomly. By failing to consider sales demand for the particular grouping of accounts, sellers may delay sales by failing to take advantage of current market demand. By way of example, a seller (without information regarding current market demand) may package a portfolio containing debt accounts from all states, a portfolio for which no current market demand exists. However, had the seller known, for example, of a market demand for similar portfolios of accounts limited to particular regions, the seller could have packaged the portfolio to meet market demand. Thus, there is a strong need for an improved system and method for grouping debt accounts into portfolios or lots for sale.

Another shortcoming of present methods for selling debt accounts is the lack of an efficient means of regrouping account portfolios. Heretofore, sellers have generally grouped accounts into portfolios and offered the portfolio for sale. If the structure of the portfolio did not meet the buyer's need, there has generally been no effective means for regrouping the accounts into a new portfolio to meet the market demands. Furthermore, if a seller and a buyer have reached an agreement as to the purchase of a portion of a portfolio, there has been no efficient means for the seller to regroup the unsold accounts into a new portfolio. Because of these limitations of presently known methods, most debt accounts are grouped into portfolios by the seller and sold as an "as is" package to buyer, regardless of the buyer's need. Thus, there is a strong need for a method and system for regrouping lots to meet sales demand.

Another shortcoming in presently known methods for selling debt accounts is the lack of automation. Heretofore, there has been no automated method or system for grouping accounts into portfolios or lots for sale, allowing potential buyers to search for lots meeting their needs, accepting purchase offers from potential buyers and communicating those purchase offers to sellers. There is a strong need for an effective automated method and system to carry out these and other transactions necessary to complete an account sale. Thus, there is a strong need for an effective automated system for facilitating the sale of debt accounts.

Another of the many disadvantages of presently known methods for selling debt accounts and other types of assets is the lack of an effective means for the buyer to completely leverage its buying power. For example, under conventional buying systems and methods, a buyer with $100,000 in funds available is generally limited to extending bids totaling $100,000 (without obtaining credit). Thus, for example, if the buyer extends two bids for $50,000, the buyer is unable to place any further bids without running the risk of over extending himself. There is a strong need for a method and system that would further extend the buyer's ability to ensure a successful purchase by enabling redundant extension of the buyer's capital resources without compromising capital budge constraints.

SUMMARY OF THE INVENTION

The present invention provides a method and system for facilitating a sale of debt accounts between a seller and one or more potential buyers. The method of the present invention preferably comprises the principal steps of (a) creating a computer readable database comprising data pertaining to a plurality of debt accounts, each account comprising a plurality of data fields; (b) grouping the accounts into at least one lot based upon at least one correlation among the data in the data fields; (c) searching the computer readable database for information corresponding to information designated by the potential buyers; (d) receiving one or more purchase offers for one or more lots from the potential buyers; and (e) communicating the purchase offers to the seller.

The present invention further facilitates a sale of an item between a seller and a buyer which comprises the following principal steps: (a) receiving from at least one seller information pertaining to a plurality of items to be offered for sale; (b) establishing a spending limit for the buyer, the spending limit including a balance which designates an amount of funds available to the buyer; (c) communicating to the buyer at least a portion of the information pertaining to the items to be offered for sale; (d) receiving a plurality of purchase offers from the buyer, each purchase offer having an item and purchase price associated therewith, wherein each purchase price may be for an amount less than or equal to the balance of the spending limit; (e) communicating the pending purchase offers to each seller; (f) receiving an acceptance of a purchase offer from a seller; (g) calculating a new balance for the buyers spending limit by deducting from the spending limit the purchase price associated with the offer; and (h) withdrawing any of the buyer's pending purchase offers for which the associated purchase price exceeds the amount of the new balance.

A system and apparatus are also provided to implement the steps of the method described herein.

DRAWINGS

FIG. 7 illustrates the grouping and presentation of bad debts.

FIG. 8 illustrates the registry and proprietary storage of data fields of an account database of the present invention.

FIGS. 12A and 12B depict phantom bidding methodology of the invention.

DETAILED DESCRIPTION OF THE INVENTION

Figure 1:
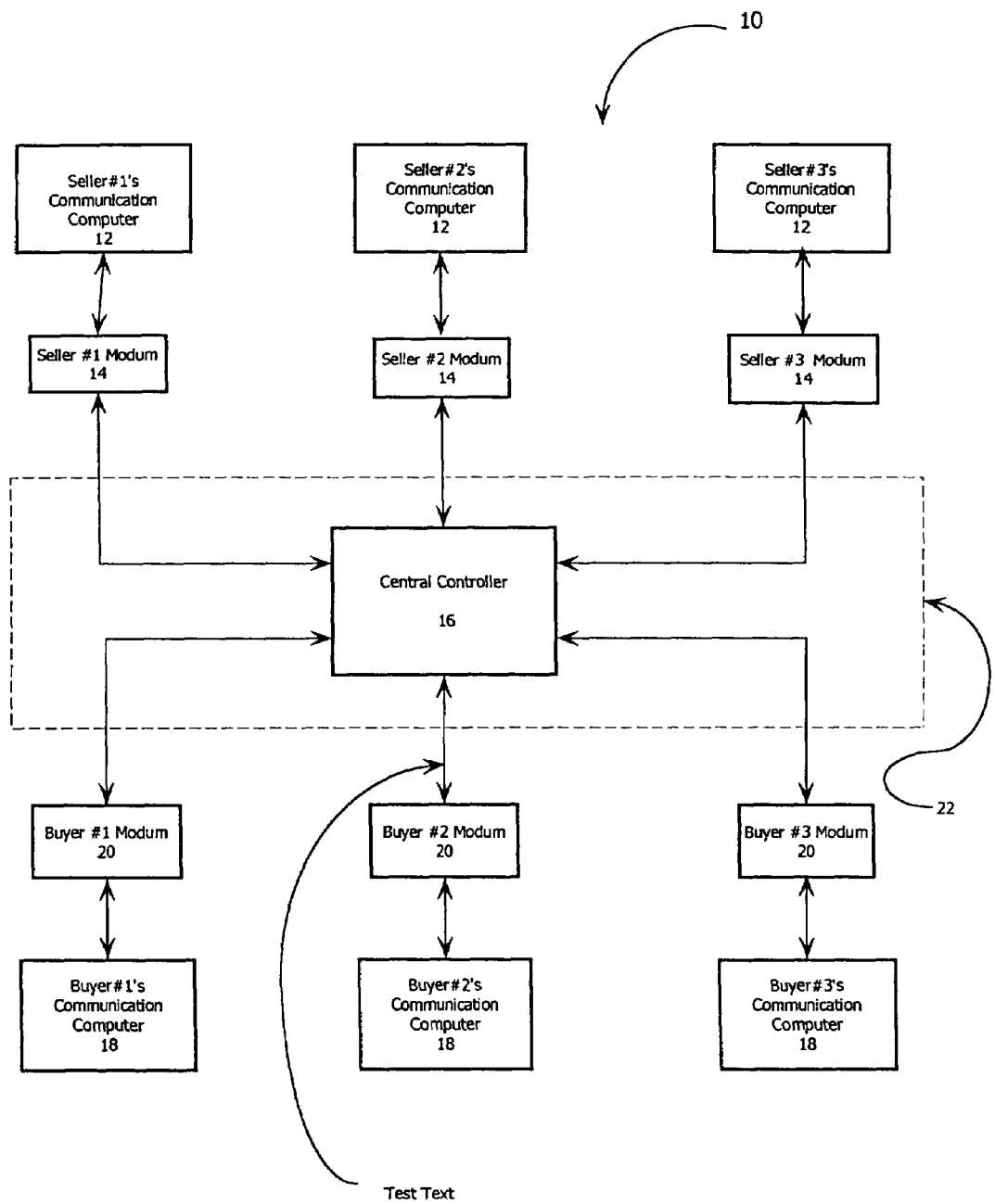
FIG. 1 illustrates the market overview of the present invention.

Referring now to the drawings, and particularly to FIG. 1, an overview of the market into which the present invention operates is there shown generally at numeral 10. This market includes a plurality of seller's communications computers 12 each having access via modem 14 to the World Wide Web 22.

A central controller 16 of the present invention represents a part of the Internet communication process of the present invention which receives information from both the seller's communication computers 12 and the buyer's communication computers 18, also connected via modem 20 to the World Wide Web 22.

Figure 2:
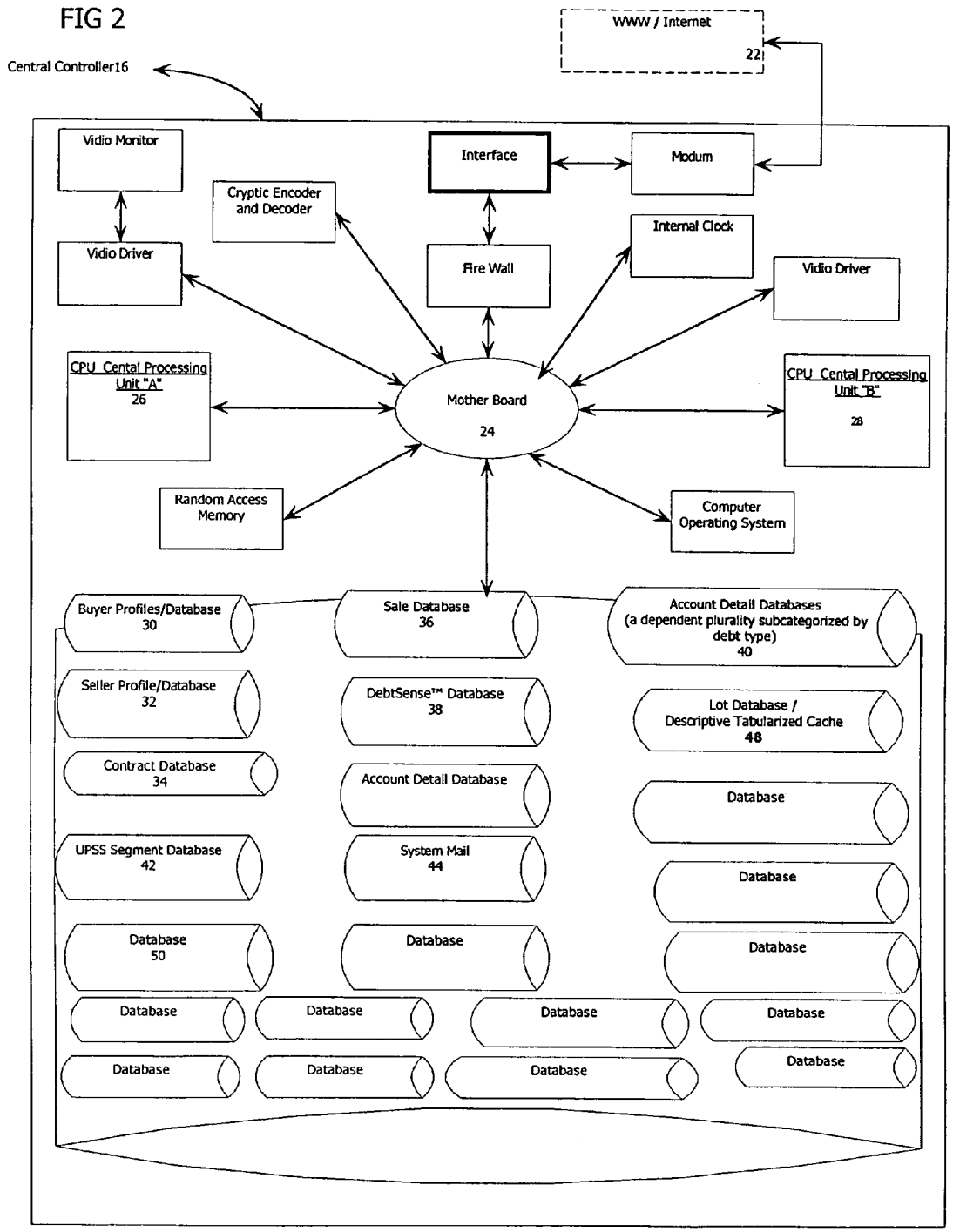
FIG. 2 is a block diagram showing the central controller (16) of FIG. 1.
Figure 3:
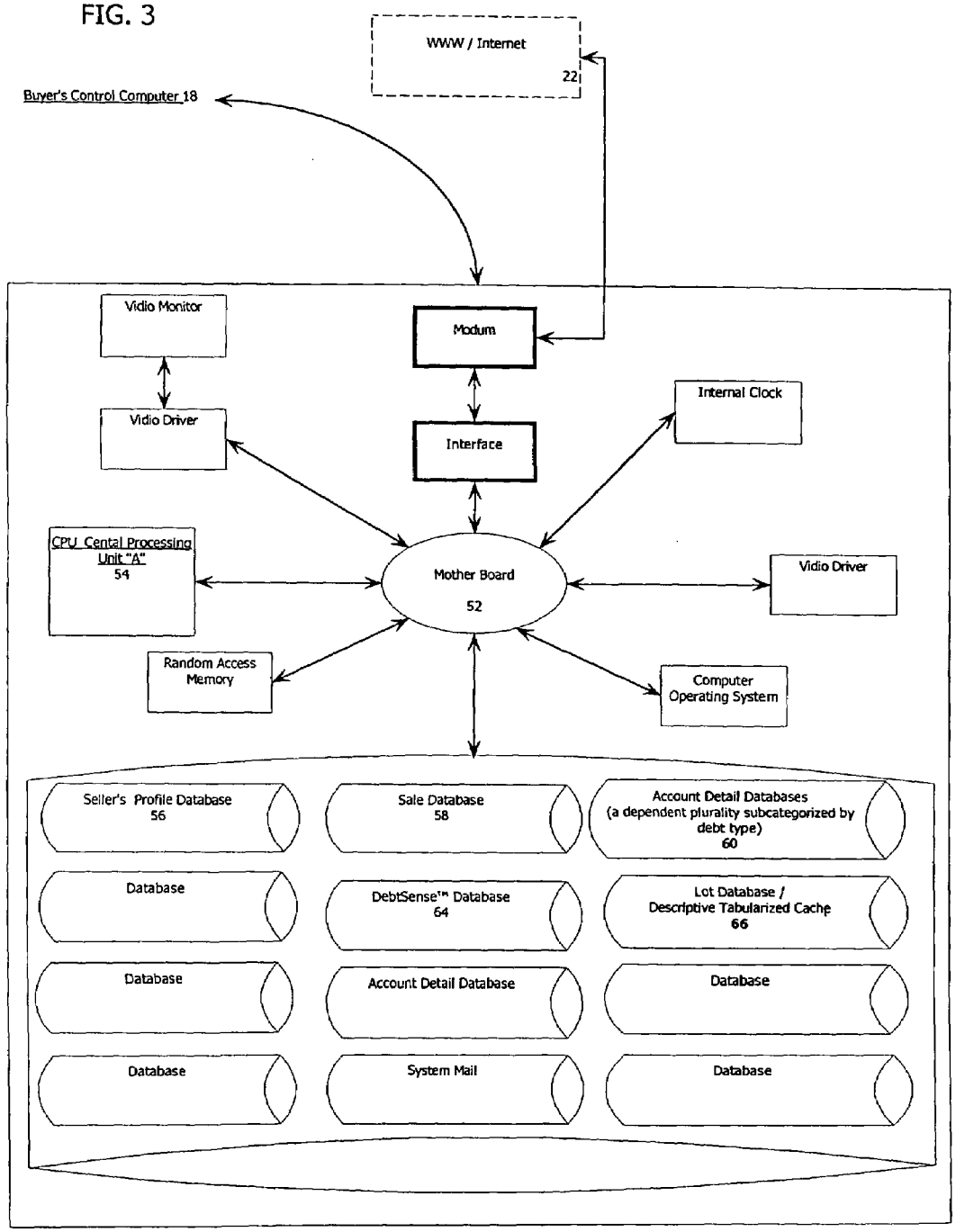
FIG. 3 is a block diagram showing the buyer control computer.
Figure 4:
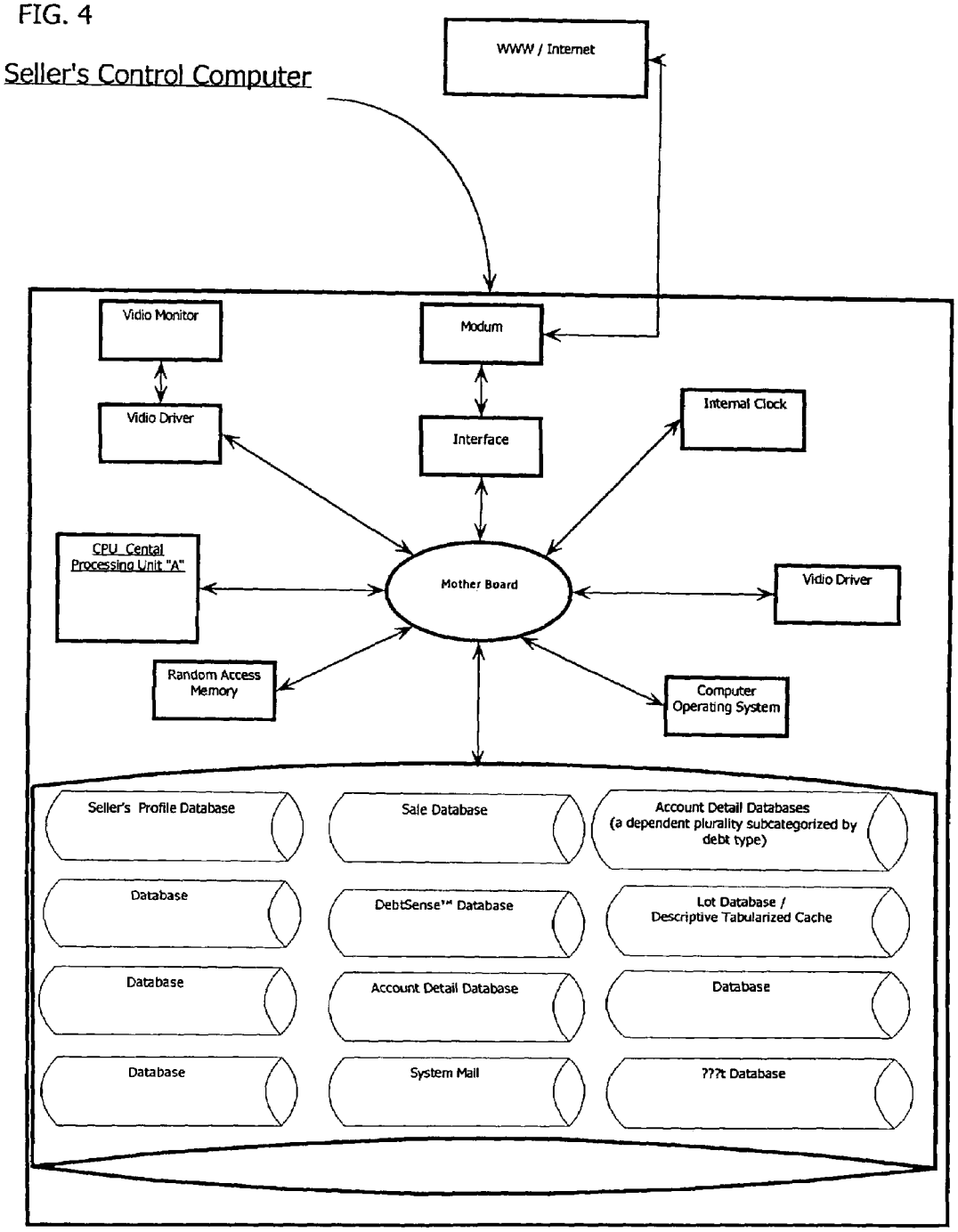
FIG. 4 is a block diagram showing one embodiment of the seller interface.

FIG. 2 depicts the central controller 16 of FIG. 1 which is referred to as an Internet information server. This controller 16 facilitates intercommunication between a seller's authorized computer and a buyer's authorized computer of this invention. In the controller 16, two cpu's 26 and 28 are provided in communication with a mother board 24 for computer redundancy. An array of Tables or databases are also operably connected within the controller 16. For example, the buyer's profile 30 provides tabularized information unique to each of the buyers related to specific identity, who can control the information in this database and other information as described herebelow.

The seller profile 32 provides a tabularized database with information related to the seller's profile including the user chiefs name, identification and PIN, and other individuals authorized to have access to the system.

The contract database 34 provides information describing the various contractual support documents and standards utilized within the system between the buyer and the seller, with some contracts also between the operator of the system herein referred to as World Wide Debt (WWD) and buyer or seller.

The UPSS segment database 42 is described more fully in conjunction with FIG. 8 herebelow. The sale database 36 provides a history of past sales associated with information on both current and past sales. The DEBT SENSE™ database 38 is a proprietary analytical tool of this invention to assist buyers and sellers in the actual process of both selling and buying debt. Each account is detailed in the particular account detail database 40 for each particular transaction between buyer and seller and also includes posted offerings by each seller. The system mail database 44 provides a direct means for both buyer and seller to communicate directly through the WWDE server. The lot database 48 provides a tabularized description of each of the particular debts within each lot and information on the source of the debt, its character, the amount of the debt, payment history, data charge-off and so forth. The remainder of the database is referred to generally at 50 include tabularized information which provides ancillary support and infrastructure details in conjunction with the process of buying and selling debt. This database 50 also provide support service after each transaction such as returning accounts and legal media supporting the legal process of debt collection.

According to an embodiment of the present invention, a method for facilitating a sale of debt accounts between a seller and one or more potential buyers comprises the following principal steps: (a) creating a computer readable database comprising data pertaining to a plurality of debt accounts, each account comprising a plurality of data fields; (b) grouping the accounts into at least one lot based upon at least one correlation among the data in the data fields; (c) searching the computer readable database for information corresponding to information designated by the potential buyers; (d) receiving one or more purchase offers for one or more lots from the potential buyers; and (e) communicating the purchase offers to the seller.

In a preferred embodiment, the step of creating a computer readable database preferably comprises the processes of Seller Entity Registration, Seller User Account Setup, Seller Account Listing and Uploading Accounts into a Presale Database.

Figure 5:
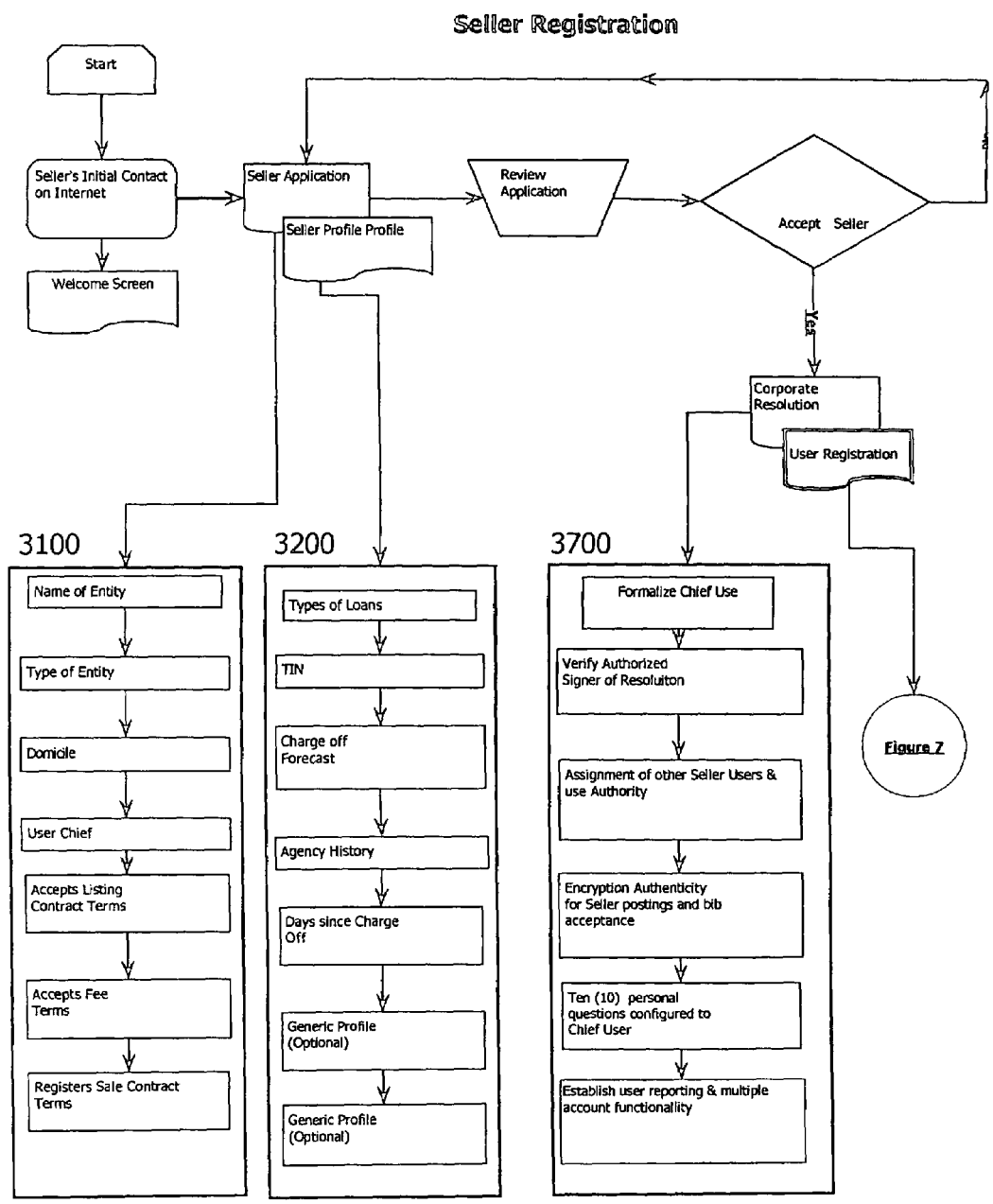
FIG. 5 illustrates a seller registration process.

In the process of Seller Entity Registration shown in FIG. 5, the seller preferably connects to a secure server to establish an initial electronic communication at 52 during which the seller is presented the "Welcome Screen." From the Welcome Screen, the seller may voluntarily select the "Registration Screen" and start the registration process. Seller preferably registers at 54 as an entity by first listing basic identification information describing the seller. This identification information would preferably include, among other things, the following:

Legal name of the entity.

The type of entity (corporation, partnership, limited liability company, etc.).

Domicile of the entity.

Identity of the seller's designated User Chief.

The seller preferably continues the account registration process at 54 by accepting the terms of the sale facilitator. This step would preferably include, among other things, the following:

Acceptance of contract terms.

Acceptance of fee terms. Standard contracts registered to a Seller will also be provided as the Seller's starting point for all contractual negotiations with prospective purchasers.

By acceptance of fee terms, Seller will preferably agree to immediately forward as instructed any earned consulting fees upon the closing and funding of any sale.

Acknowledges acceptance of registration contract term by returning copy of completed contract executed by an authorized officer of the entity.

At the time of registration, or before the entity actually lists debt to be sold, it will preferably complete a "Seller Profile" form 56. Seller profile information would preferably include, among other information, the following:

The primary loan types to be offered for sale.

Tax identification number.

Forecast or estimate of future debt charge offs.

Forecast or estimate of amount of expected monthly charge offs that will be sold.

Approximate the characterization of the debts with respect to "agency history".

Approximate the characterization of the debts with respect to "days since charge-off".

Seller will have an option to prepare a generic profile description for public consumption within this electronic marketplace. Approval of this promotional listing for posting and distribution to member sellers and buyers would enhance seller's presence within the marketplace.

Approximate the characterization of the debts to be offered for sale with respect to generic and demographic data.

The seller will preferably designate a user chief in the seller's organization. The user chief will have the highest level of control of the user account management. The seller may require a corporate resolution document 58 granting account control to a specific department head within the organization. A printable form to make such a designation may preferably be available online. The seller will also preferably have an optional generic profile area providing information on the seller's organization for public viewing.

In the process of seller user account setup, the user chief will preferably enter account authenticity and verification information (e.g., a series of personal questions) which will be stored with the account. The user chief will preferably be instructed as to the type of web browser to use as the primary interface method. The user chief will then preferably enable administrative accounts for administrative personnel who will be able to access and manage sale-related functions. Preferably, only the user chief will be allowed to accept or decline bids and will have data pertaining to the wiring or management of funds relating to debt sales. The seller's designated administrative users will, preferably, be able to unload accounts to a database and generate reports relating to contract fulfillment costs, balances, etc.

Figure 6:
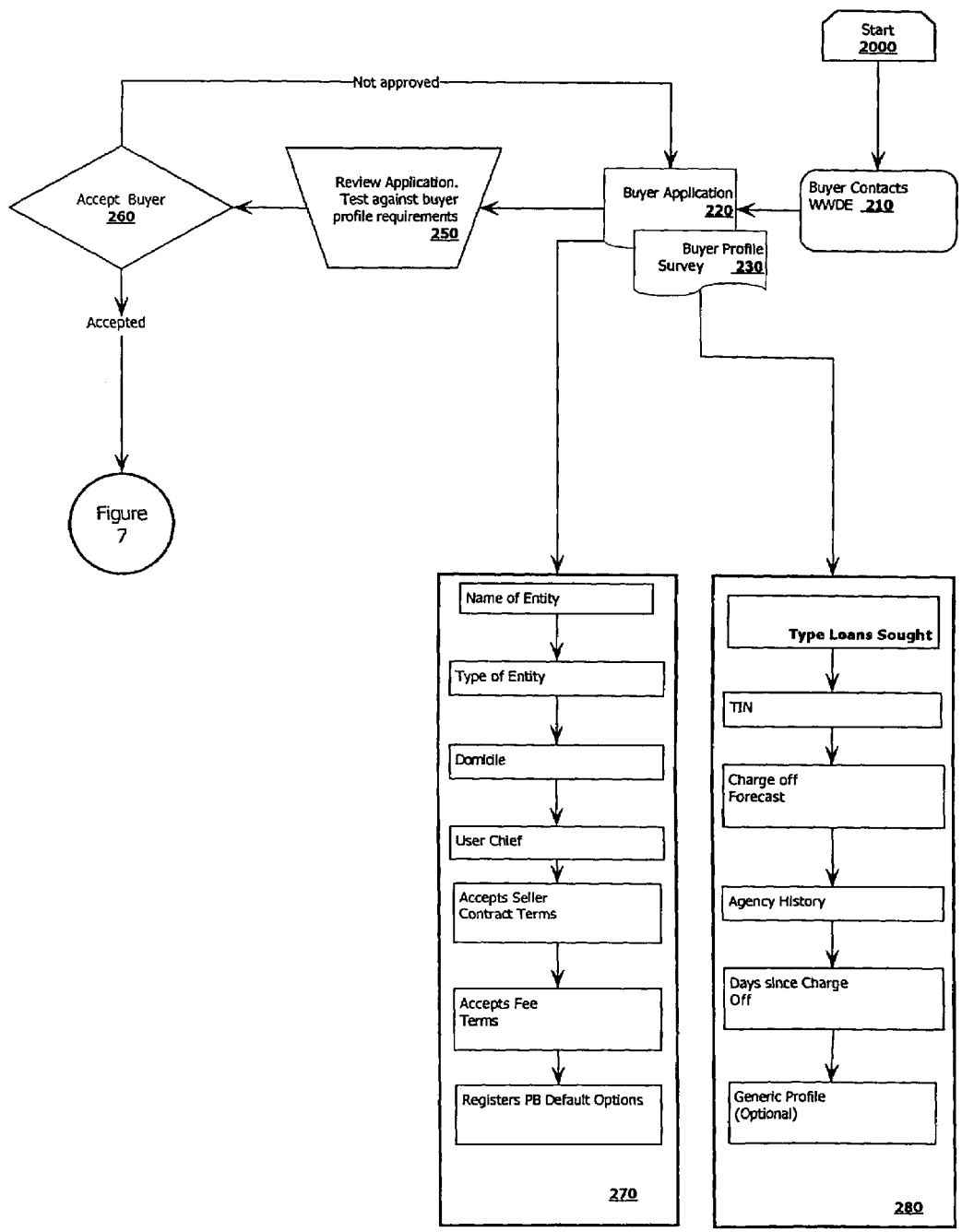
FIG. 6 illustrates a buyer qualification process.

Referring now to FIG. 6, the buyer qualification process is there shown in flow diagram format. This process is critical to the buyer in that information is provided to WWD at 60 after which a buyer application is forwarded at 62 to be reviewed and tested against standardized buyer profile requirements at 64. It is important to each seller that the buyer profile be carefully scrutinized prior to commencement of debt sale negotiations. The profile of the buyer's debt purchase interest is shown to each seller at 66. Further details of each buyer are shown at 68 and details of the loan interest are shown at 70. After the buyer has been fully qualified in the eyes of a particular seller at 72, the buyer is then permitted to enter into the process of evaluating that particular seller's debt offerings as shown in FIG. 7 herebelow.

Referring now to FIG. 7, in the process of Seller Account Listing, the seller will preferably identify and tag certain accounts or groups of accounts for sale and export those accounts in one or more files. Each of these files will preferably be in a standard PC II data format comprising a plurality of data fields. Each data entry will preferably comply with a set of data definitions, field types and naming conventions, verifed at 75 before uploading the data. Upon import, the data files will preferably be stored in a database called a presale queue 77, where the data will be scanned for viruses. Once verified to be clean of viruses, the data will preferably again be scanned to ensure that the data complies with the required data definitions, field types and naming conventions. Some accounts may be rejected at 81 based on bad or missing information. Rejected accounts may, preferably, be output to the seller to take in file or printed form. Those accounts may later be resubmitted with more complete information archived permanently by the seller.

In FIG. 8, the system's principals and methodology of establishing an international debt uniform identification code as part of the Unique Proprietary Storage Segment (UPSS) are there shown. The data pertains to ownership changes, service requests of the buyer and seller, the buyer/service provider, the seller/service provider and the seller buyer. The information utilized to determine each portion of the identification code is shown in detail in FIG. 8.

Still referring to FIG. 7, the step of creating a computer readable database preferably includes the process of uploading accounts to the presale queue 77 as previously described. Once the accounts have been uploaded into the presale queue 77, those accounts are preferably ready and available to a variety of processes. An important part of this first step to distressed debt sales is the report-ready information that is being stored with each upload of information. This data can preferably be made available to the seller at 74 through consolidated reports that can summarize previous sales (e.g., by date, date-range, month or year group, asset sale or placement type and/or balance range in combination or stand-alone). The debt account has preferably been registered based on a unique index that will enable a host of tools and functions in the future management of the accounts.

The debt accounts will preferably be grouped into lots 78 based upon at least one correlation among the data in the data fields. The step of grouping the lots 78 preferably further includes the step of receiving from the seller at least one criterion upon which the accounts are to be grouped into lots. (e.g., y region, state ot two-digit ZIP code). Similarly, for example, country, province, postal code, city code and other intenational aggregations may be available to international sellers. These standard consolidations will then be preferably transferable to new combinations by drag-and-drop interface to create new aggregations 80, depending on the seller's objectives.

The seller will preferably be able to review the proposed lot 78 at this point and leave it disenabled until such time as the seller chooses to proceed. In the event the seller intends to combine other accounts not yet imported, the seller can preferably combine any accounts together into a Summary Data Sheet (SDS) 83 despite their input-file origin. Because large credit issuers may have files that contain different product types based on account number ranges, a tool specifying the first four to eight digits of an account number will preferably allow the seller to measure the product mix and parse it into separate lot assignments 81(SDS) for a given sale.

Once the seller has delineated accounts into the desired lot assignments 78, he can preferably enable the sale and proactively seek out compatible buyers meeting any combination of criteria in FIG. 6.

The method of the present invention further includes the step of searching the computer readable database for information corresponding to information designated by the potential buyers again, in FIG. 6. Potential buyers are preferably informed when at least some of the designated information has been found in the searching step. In a preferred embodiment, at least a portion of the presale database is uploaded to a computer readable database accessible via a computer network, which may be either an internal network or a global computer network (e.g., the internet).

Still referring to FIG. 7, the method of the present invention also includes the steps of receiving one or more purchase offers 84 for one or more lots from the potential buyers and communicating the purchase offers to the seller. Each purchase offer 84 preferably includes a purchase price and an identification of a lot offered for sale. The purchase offer preferably further includes terms of the proposed purchase contract 82. In a preferred embodiment, the purchase offer made by the potential buyer need not conform to the lot and/or terms offered by the seller. For example, the buyer may preferably be able to specify that its purchase offer is based on (a) the seller's proposed contract 82, the seller's proposed contract with certain additions or modifications, or another contract; (b) specific warrantees regarding repurchases duration; (c) delivery by the seller of media support; (d) amount of media for free based on count or face value; (e) warranties regarding bankruptcy or deaths associated with accounts; (f) allowances for fraud repurchases; (g) cutoff dates expressed as closing date or days prior to closing or a specific date; and/or (h) whether seller or buyer will scrub the lot for bankruptcy and deceased accounts.

Once the seller has released the accounts 80 for sale, the seller will preferably be able to manage each lot or sale manually or choose a variety of policy rules set for each lot or sale. For example, the seller may establish a rule that "all bids under 5% of the seller's minimum reserve will be automatically rejected but all bids above 5% will be reviewed by the seller's user chief."

The method of the present invention may preferably include the step of receiving from the seller an acceptance of a purchase offer. Acceptance of a purchase offer establishes a purchase contract between the seller and the buyer.

The method of the present invention may preferably include the optional step of scrapping and regrouping of lots. In one embodiment, the seller has the option of scrapping any unsold lot. The scrapped lots may optionally be regrouped into one or more new lots. In another embodiment, lots are scrapped to conform to a purchase offer. For example, a potential buyer may submit a purchase offer for a lot that does not conform to the lot offered for sale by the seller. The seller may then scrap one or more existing lots to produce one or more new lots conforming to the purchase offer. For example, one of the modifications a potential buyer can suggest is some type of carve out that that represents a regrouping of the accounts in the lot. For instance, a buyer might offer to purchase only the accounts in the Western United States with balances between $500 and $5000. Similarly, the potential buyer could present an offer comprising a regrouping of more than one of the seller's lots. If the seller accepts such a carve-out bid, the lots are then scrapped and regrouped into new lots conforming to the accepted purchase offer.

Upon deciding to accept a purchase offer from a buyer, the seller will preferably be provided with the terms of the purchase offer for review. For example, the user chief may click on a link to review the terms given for the purchase offer. Upon acceptance, the purchase offer preferably becomes binding upon the buyer and the seller in the form accepted. Preferably, the accounts cannot change after acceptance unless they are represented to have been removed because of a determination that the debtor associated with account is either bankrupt or deceased. The binding obligation preferably initiates a Buyer-Seller Status Watch to ensure closing goes smoothly.

In a presently preferred embodiment of the invention, buyer and seller each download a version of the contract, execute a copy and send it to the sale facilitator by facsimile. The signed fax documents are then re-faxed to the other party for counter-signature, which becomes the operating document for the portfolio purchase. Alternatively, the contract may be executed electronically by using user-encrypted response guarantees, wherein the buyer and seller would preferably execute the written contracts using electronic signatures.

The method of the present invention may further include the step of transmitting debt accounts to the buyer upon receipt by the seller of the purchase price associated with the accepted purchase offer. Once the seller has received his funding for a given purchase contract, the seller preferably confirms the funding amount and date received for the lot or lots, releasing a special password for the buyer to retrieve the complete data file comprising the accounts purchased. As part of post-sale processing, the buyer may preferably make post-sale requests for application copies, statements or copies of statements within given date ranges or unspecified, check copies or other information regarding the debt accounts purchased.

At the time of closing, a repurchase data file is preferably established to track the accounts submitted, accepted and refused by the seller as qualified put-backs. Open balances will preferably be reconciled pro rata between buyer and seller. Buyer and seller may agree to the use of standardized notices for meeting repurchase deadlines.

The present invention preferably includes a means for recording data and producing reports for each sale and lot, for example, pertaining to the underlying debt characteristics as well as the time required to sell, amount of sale, amount of lot, aggregation characteristics (state, region, zip, debt issue type, combination), service obligation level to date and buyer account balances, if any. The reports are preferably available to the seller only and are considered proprietary information of the seller. Reports are preferably printed from html documents or in download form.

Figure 9:
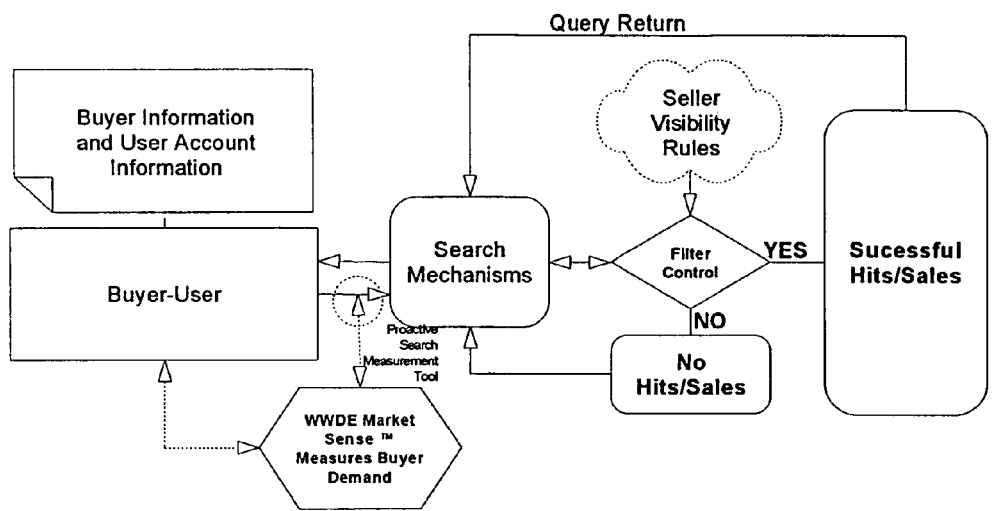
FIG. 9 illustrates the searching inquiry mechanism of the present invention.

Referring to FIG. 9, the method of the present invention may preferably include the steps of recording data relating to search inquiries, purchase offers, and sales, and utilizing the recorded data to gauge current and/or historical market demand. This process will preferably enable the seller to gauge the inquiry of buyers and will suggest an account grouping and/or regrouping strategy based on current or perceived demand over a period of time (e.g., 1, 10, 30 or 90 days). The process may also preferably suggest a minimum number of accounts to include in a lot. If lots offered for sale are scrapped and regrouped to meet current or perceived demand, any outstanding bids for the scrapped lots will preferably be automatically rejected and new lot assignment effected.

Figure 10:
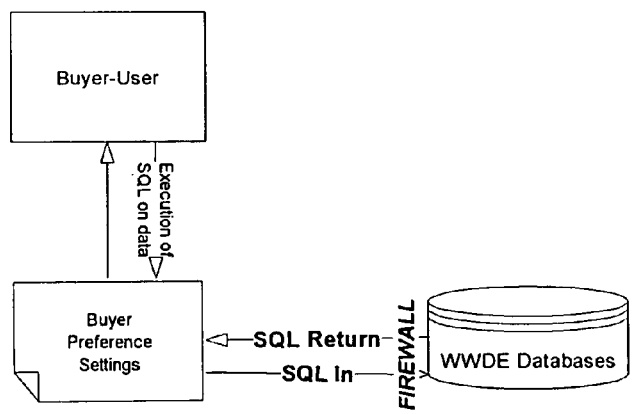
FIG. 10 illustrates the method of assisting the buyer in understanding details of each complex asset of the present invention.

Referring now to FIG. 10, one aspect of DEBT SENSE of the present invention is provided to assist a buyer in understanding the details of each complex asset of the present invention. It is important that the buyer be provided with all tools and information related to each of the debts being offered by each seller. The basic set of parameter statistics and other lot profile services provide a uniform, predictable and easy-to-understand presentation of sales and their lot components. Recalculating the basic traits of the complex asset, which would ordinarily take hours to do manually, is done with minimal effort giving the debt buyer a broader exposure of available debt or paper from which to choose and/or make a purchase offer.

Figure 11:
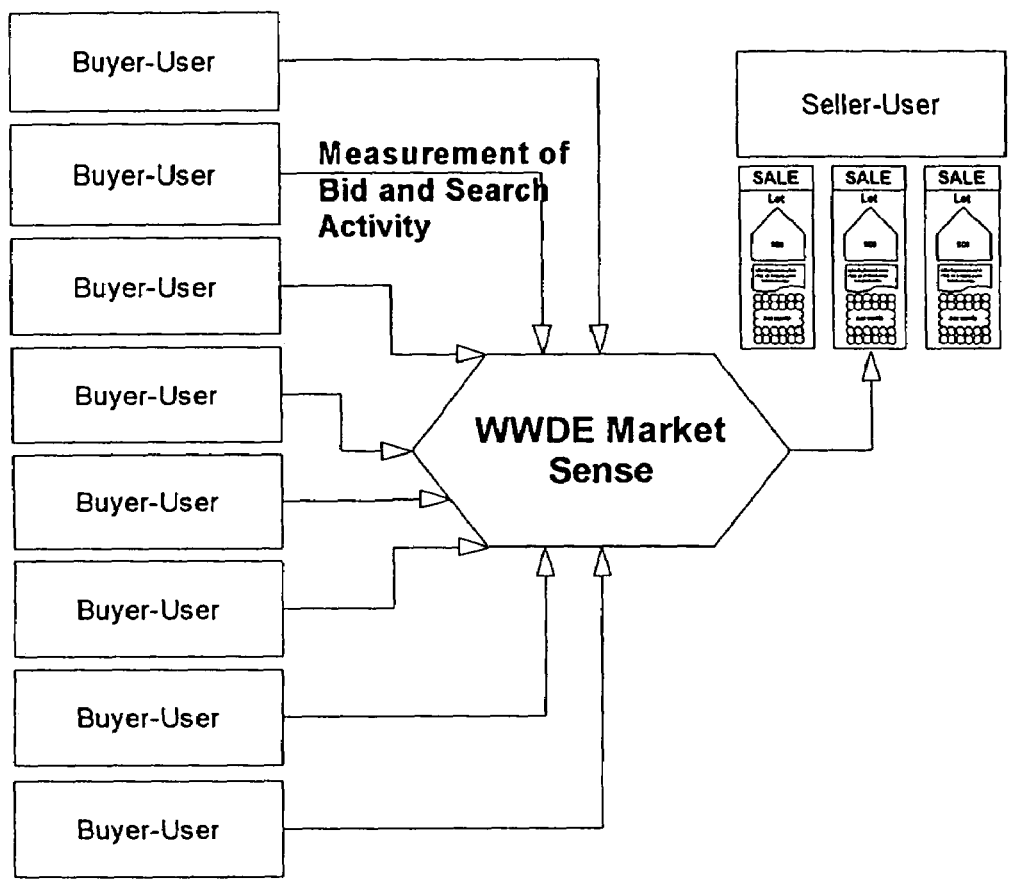
FIG. 11 illustrates the process of assisting the buyer in understanding details of a complete debt offering of the present invention.

Referring now to FIG. 11, the method of the present invention includes a buyer-seller compatibility matching and optimal sublot packaging based upon the WWDE Market Sense aspects. Tracking daily activity of bids ad searches helps a seller to reshape his profile for sale to appeal to the broad variety of buyers. WWDE's seller's tool include the ability to reassociate in optimal combinations unsold lots or sublots or any other specification desired by the seller within moments. This function was previously unavailable in any form. Moreover, with the lack of information on bad debt, all industry players will, for the first time, be able to see and recognize industry trends by viewing on-line summary statistics for the industry, taking exact measurements of activity.

PHANTOM BIDDING*

Referring now to FIGS. 12A and 12B, the present invention further includes a method and system for facilitating a sale of an item between a seller and a buyer. The method preferably comprises the principal steps of receiving from at least one seller information pertaining to a plurality of items to be offered for sale; establishing a spending limit for the buyer, the spending limit including a balance which designates an amount of funds available to the buyer; communicating to the buyer at least a portion of the information pertaining to the items to be offered for sale; receiving a plurality of purchase offers from the buyer, each purchase offer having an item and purchase price associated therewith, wherein each purchase price may be for an amount less than or equal to the balance of the spending limit; communicating the pending purchase offers to each seller; receiving an acceptance of a purchase offer from a seller, calculating a new balance for the buyers spending limit by deducting from the spending limit the purchase price associated with the offer; and withdrawing any of the buyer's pending purchase offers for which the associated purchase price exceeds the amount of the new balance.

PHANTOM BIDDING is a trademark of Worldwide Debt Exchange, LLC, a Florida corporation.

In an alternative embodiment the potential buyer may establish a deposit account corresponding to the spending limit. The deposit account will preferably correspond to an amount of funds deposited by or credited to the potential buyer for which the buyer has available for purchases.

This method described above (hereinafter referred to as "PHANTOM BIDDING") further extends the buyer's ability to ensure a successful purchase by enabling redundant extensions of the buyer's capital resources. Phantom bids multiply a buyer's market presence without compromising capital budget constraints. PHANTOM BIDDING will preferably serve to accomplish a maximum exposure position and, upon the successful conclusion of various bids that may have been extended by the buyer and where the desired purse has been reached, all remaining bids are immediately withdrawn.

PHANTOM BIDDING provides several key improvements in the bidding process. Current methods restrict a buyer's opportunity to extend offers to purchase beyond the buyer's available cash, available credit, and or standby credit. This total of capital available for investment is referred to the buyer's "available purse." Once an offer to purchase has been extended to a seller, typically a buyer will not extend additional offers that in the aggregate would exceed the total of its ability to meet the total financial exposure of its funding obligations. Until the seller declines the buyer's offer, those funds earmarked for that specific purchase cannot be redirected to another opportunity to acquire additional product without possibly compromising the available purse. Because PHANTOM BIDDING provides the buyer with a greater opportunity to participate in the market, the buyer will have the opportunity to bid more aggressively knowing its available purse will not be over obligated by the system's internal controls. Valuable time is lost opportunity to the buyer in terms of conducting its business without interruption. It is not uncommon for a buyer to go without the needed product because it could not win a competitive bid against its competitors. Frequently while awaiting bid negotiations, other opportunities of equal and or similar value are awarded to competitors because the buyer's available purse limited the buyer's involvement in extending additional bids. PHANTOM BIDDING expands the buyer's ability to participate in the bidding process with multiple bids, the aggregate total obligation of which would exceed the buyer's available purse.

With PHANTOM BIDDING, buyers have the opportunity to participate in more of the market activity by extending multiple bids whose aggregate total would exceed the buyer's available purse. The total value of all of the bids within the marketplace at any given moment have the opportunity to exceed that aggregate capital available to all the buyers actively bidding at that specific time. If the seller can distinguish the difference from a normal and PHANTOM BID, a seller has the choice of quickly accepting an offer and securing his rights to a larger share of the aggregate purse available within the market at a given moment. In effect, by accepting a PHANTOM BID a seller preempts his competitive sellers by removing from the market buyer capital and reducing the finite available purse. The information management system immediately obligates that portion of the wining buyer's available purse, and withdraws all other bids for the winning buyer that would exceed that buyer's remaining available purse.

It should be emphasized that the method of PHANTOM BIDDING described herein is not limited to the sale of debt accounts, and could be used to facilitate the sale of any item.

Those skilled in the art will recognize that the methods and systems of the present invention have many applications and that the present invention is not limited to the representative examples disclosed herein. Moreover, the scope of the present invention covers conventionally known variations and modifications to the system and components described herein, as would be known by those skilled in the art.

What is claimed is:

1. A computer system for facilitating a sale of a plurality of items between one or more sellers and one or more potential buyers, comprising:
   a memory storing data received from each seller identifying a plurality of items to be offered for sale; and
   a processor operatively connected to the memory, the processor programmed to:
   (a) establish an available purse designating a maximum amount of funds made available by each potential buyer;
   (b) communicate to each potential buyer the offer for sale of each item and a predetermined portion of the data as established by each seller pertaining to the items offered for sale;
   (c) receive purchase offers from each potential buyer, each purchase offer having an item and purchase price associated therewith, wherein each purchase price may not exceed the balance of the corresponding available purse, but wherein an aggregate of all pending purchase offers by each potential buyer may substantially exceed the amount of funds available to the corresponding potential buyer;
   (d) communicate the pending purchase offers to each corresponding seller;
   (e) receive an acceptance of a purchase offer from a seller;
   (f) immediately after step (e) calculate a new balance of each available purse by deducting from the available purse the purchase price associated with the offer; and
   (g) withdraw any of corresponding potential buyer's other pending purchase offers for which the associated purchase price exceeds the amount of the new balance.

2. Using a central computer system, a method for facilitating a sale of a plurality of items between a seller and a buyer through PHANTOM BIDDING comprising the steps of:
   A. receiving information from at least one seller pertaining to a plurality of items to be offered for sale;
   B. establishing a spending limit for the buyer which designates a maximum amount of funds available to the buyer;
   C. receiving a plurality of purchase offers from the buyer, each purchase offer having an item and purchase price associated therewith, wherein each purchase price may not exceed the balance of the spending limit, but wherein an aggregate of the total price of all pending purchase offers by the buyer may substantially exceed the amount of funds available to the buyer;
   D. communicating the pending purchase offers to each seller;
   E. receiving an acceptance of a purchase offer from a seller;
   F. immediately withdrawing any of the buyer's other pending purchase offers;
   G. calculating a new balance for the buyer's spending limit by deducting from the spending limit the purchase price associated with the offer immediately after step E; and
   H. in step F, withdrawing other of the buyer's pending purchase offers only for which the associated purchase price offered by the buyer exceeds the amount of the new balance.

3. A device for facilitating a sale of a plurality of items between one or more sellers and one or more potential buyers by approved remote access to said device, said device comprising:
   a memory storing data received from at least one seller identifying a plurality of items to be offered for sale by a corresponding seller; and
   a processor operatively connected to the memory, the processor programmed to:
   (a) establish a spending limit for each potential buyer;
   (b) communicate to each potential buyer, as designated by each seller, at least a portion of the data pertaining to the corresponding items to be offered for sale;
   (c) receive purchase offers from each potential buyer, each purchase offer having an item and purchase price associated therewith, wherein each purchase price may be for an amount less than or equal to the corresponding spending limit, collectively, the plurality of purchase offers totaling a multiple of the spending limit;
   (d) communicate the pending purchase offers to each corresponding seller;
   e) receive an acceptance of a purchase offer from a seller;
   (f) calculate a new balance for the buyer's spending limit by deducting from the spending limit the purchase price associated with the offer
   (g) withdraw buyer's other pending purchase offers which individually exceed the amount of the new balance.

* * * * *